Sept. 12, 1967 R. L. POLAND 3,340,797
TRIP MECHANISM
Filed Jan. 17, 1966 3 Sheets-Sheet 3
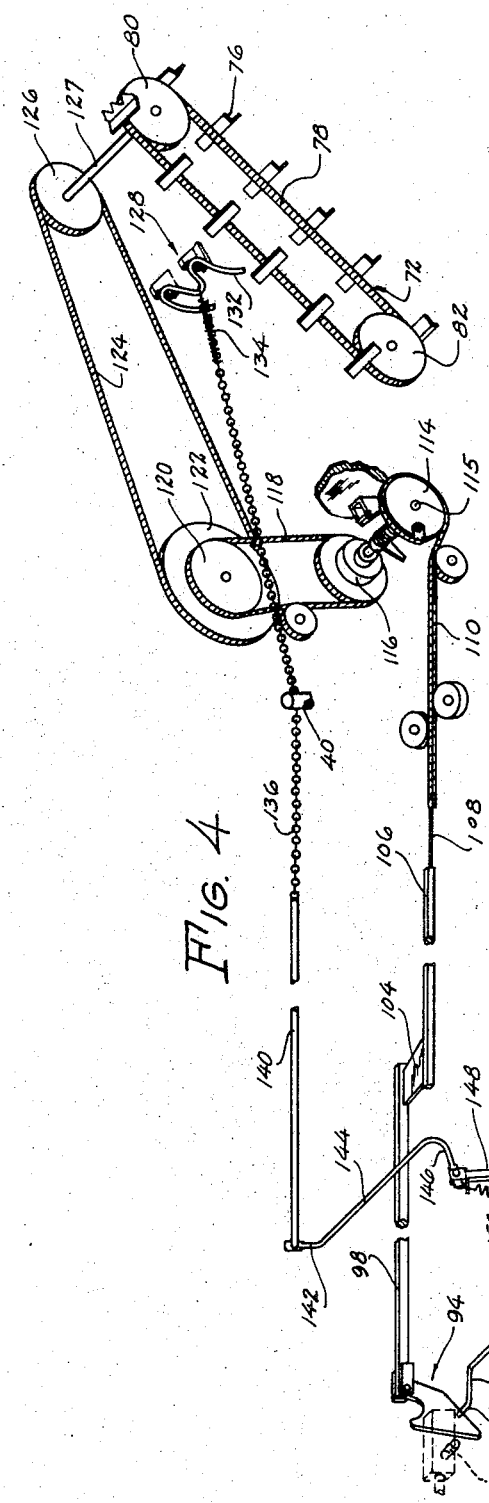
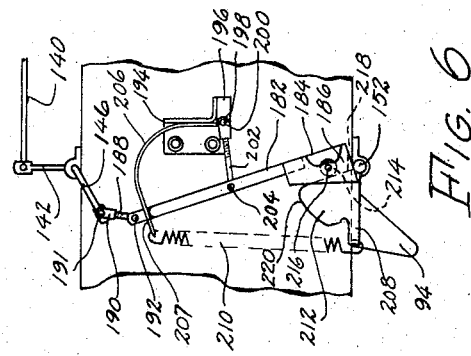
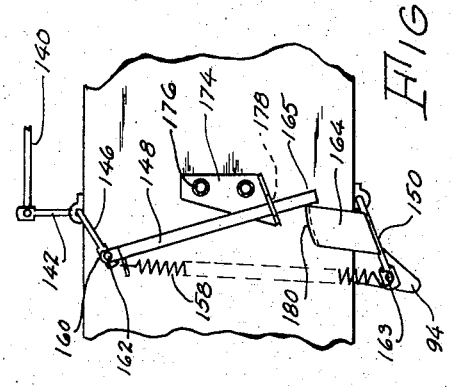
INVENTOR.
ROBERT L. POLAND

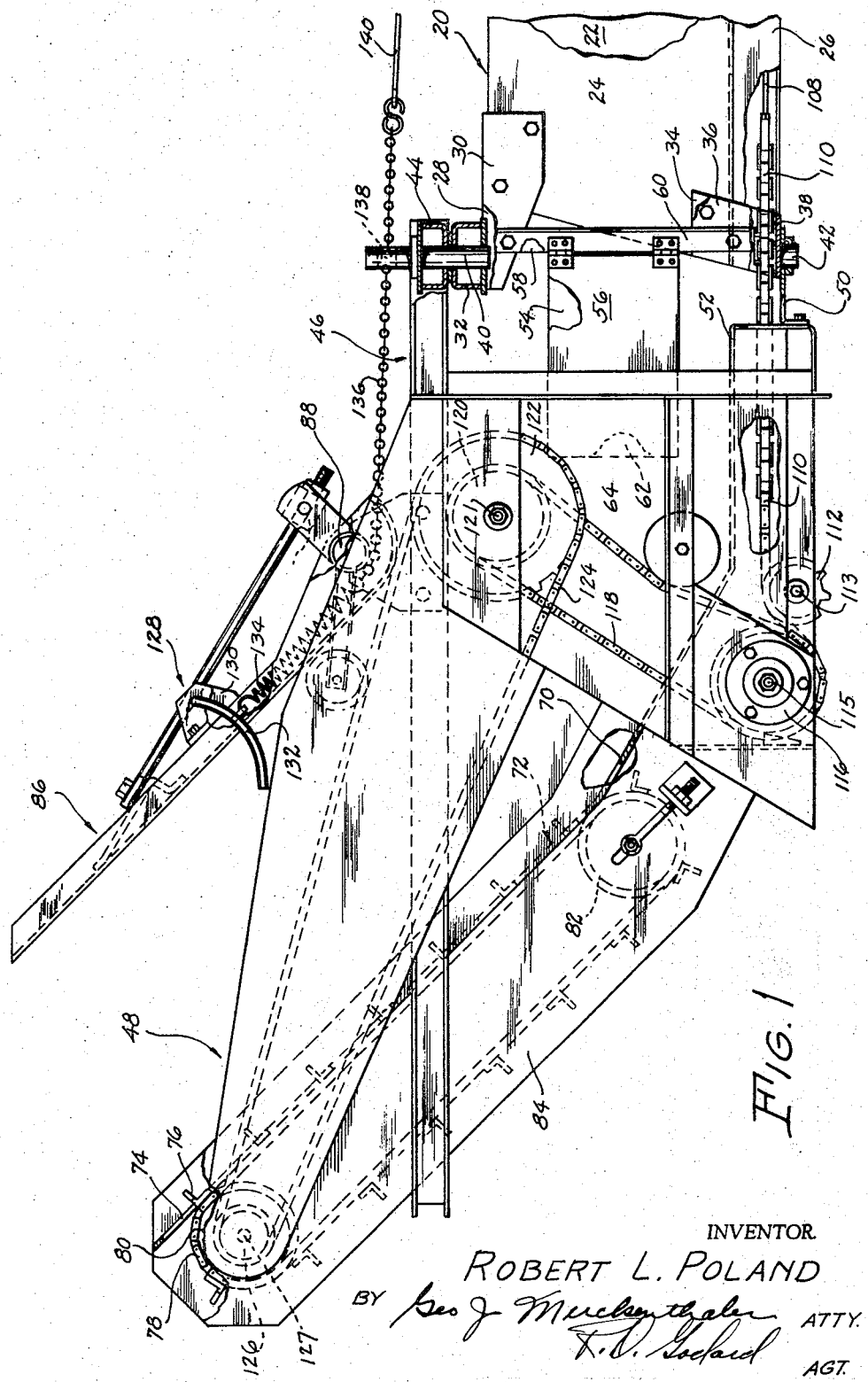

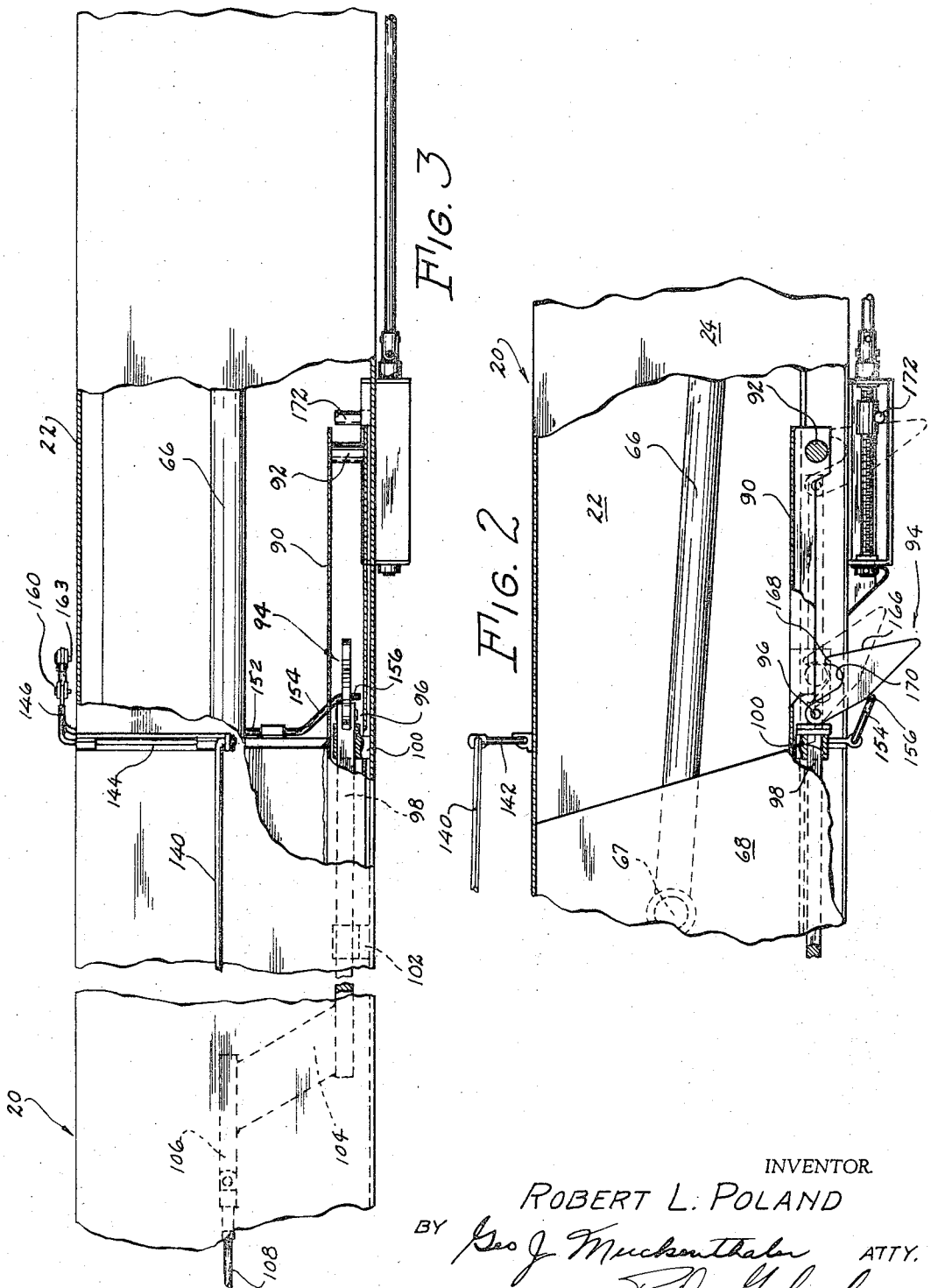

United States Patent Office 3,340,797
Patented Sept. 12, 1967

3,340,797
TRIP MECHANISM
Robert L. Poland, Kewanee, Ill., assignor to J. I. Case Company, Racine, Wis., a corporation of Wisconsin
Filed Jan. 17, 1966, Ser. No. 521,113
12 Claims. (Cl. 100—188)

The present invention relates to mechanism for throwing or tossing bales of hay or similar material, and particularly to such apparatus for throwing bales from a baler directly into a wagon or the like trailing behind a baler, also known in the trade as bale throwers or bale launchers, and particularly to a trip mechanism for acuating the bale thrower, and an object of the invention is to generally improve devices of this class.

Prior devices of this kind have been used to throw the bales of hay into a trailing wagon, the bale thrower being driven from the baler plunger, as shown in U.S. Patent No. 3,198,106, issued to R. B. Skromme and assigned to applicant's assignee. The advantages and operation of the bale thrower and its drive mechanism from the plunger are fully shown and disclosed in the above-mentioned patent and this type of drive has proved successful in the baling art. However, an important detail of this type of drive is to make sure that the bale thrower is fully actuated at the exact instant in the cycle of plunger travel. With each reciprocation of the plunger, a bale is being formed and when the bale is ready to be thrown, the actuating means or trip mechanism must fully engage with the plunger so as to drive the bale thrower only on one direction of travel of the plunger. The bale thrower is thus connected to and disconnected from the plunger on one reciprocation thereof.

The main object of the invention is to provide a trip mechanism for a bale thrower which is an improvement over prior devices.

Another object is to provide a trip device which insures that the bale thrower drive quickly and fully engages with the driving means.

A further object is to provide a mechanism which is incrementally loaded and then released at a predetermined point to quickly and fully engage the bale thrower drive with the reciprocating plunger.

Further objects and advantages will become apparent from the following specification and accompanying drawings, in which:

FIGURE 1 is a right side elevation of a fragment of a baler showing the bale thrower, parts being broken away and others in vertical axial cross section;

FIG. 2 is a right side elevation of a fragment of the baler further forward, and with parts broken away to show a thrower actuating mechanism;

FIG. 3 is a fragmentary plan view of the same;

FIG. 4 is a perspective taken from the left and a little ahead of the bale thrower in the nature of a diagram on a reduced scale and with parts omitted, but suitable for illustrating the operation of the device;

FIG. 5 is a fragmentary left side elevation of the mechanism shown in FIGS. 3 and 4; and FIG. 6 is a fragmentary left side elevation of a modification of the mechanism shown in FIGS. 3 and 4.

As seen in FIGS. 1, 2 and 3, the baler with which the trip device is associated includes a bale case 20 constituting the main structural element of the machine, having side walls 22 and 24, and a bottom compressing rail 26.

Walls 22 and 24 have fixed thereto at their upper rear corners, brackets 28 and 30 which carry a cross member 32 connecting the upper edges of the walls. Walls 22 and 24 also have lower brackets 34 and 36 carrying a cross member 38 below rail 26. Cross member 32 has journaled therein a pivot pin 40 which is preferably vertically aligned with a pivot pin 42 fixed in relation to the lower cross member 38. Pivot pin 40 is fixed in relation to a cross member 44 forming part of the framing generally designated as 46, of the bale throwing mechanism or unit 48. In similar manner, pin 42 has journaled thereon a bearing bracket 50 fixed in any suitable manner, to a down-turned section of a deck portion 52 of mechanism 48 so that the latter is supported on pins 40 and 42 and is capable of swinging from side to side about these pins. In this way, unit 48 may be maintained by suitable mechanism in properly aimed relation to a trailing wagon so that bales projected by the mechanism will not go astray.

It will be noted that deck 52 and rail 26 of the baler are disposed substantially on a level with each other, so that a bale in the act of being pressed out of chamber 20 will readily bridge the gap between rail 26 and deck 52 and slide along the latter for further processing.

Side wings 54 and 56 are hinged to vertical members 58 and 60 carried respectively on brackets 28, 34, and 30, 36. These substantially close the space between side walls 22 and 24 and side walls 62 and 64, respectively, of unit 48. Wings 54 and 56 prevent the bales from swelling in the space between the two units, and more particularly serve to guide the bales into the throwing mechanism when the latter is displaced to one side. This would be the case when the baler and trailing wagon were negotiating a turn.

The baler is pulled by a drawbar fixed in any suitable manner to the forward end of the baler and attached to the drawbar of a tractor. The tractor has a seat defining an operator's station, and it also has the other essential structures, not necessary to further describe, and actuates a power take-off shaft of well-known type which drives a flywheel actuating the plunger of the baler. The plunger is actuated by conventional and well-known means which includes a pitman 66 on a pin 67 and imparts the reciprocating motion to the plunger as disclosed in above-mentioned U.S. Patent No. 3,198,106.

It will be understood that expedients of well-known type are present, but unnecessary to show and describe, for introducing fibrous material in position to be compressed by plunger 68, and suitably tied. The material is then forced rearwardly, eventually into unit 48 in the form of a bale to be thrown into a wagon.

Deck 52 is of a width corresponding to bale case 20, extends rearwardly and has a portion 70, FIG. 1, extending rearwardly and upwardly and substantially coextensive with an endless conveyor, generally designated as 72, extending rearwardly and upwardly. Deck portion 70 continues at a steeper angle and has an opening 74 through which flights 76 may extend above the deck and engage a bale as it is forced rearwardly by the action of the baling plunger 68.

Conveyor 72 is preferably in the form of a chain 78 carried on a sprocket 80 at its upper end, and on an idler sprocket 82 at its lower end. Sprockets 80 and 82, together with chain 78 and flights 76 operate in a relatively narrow casing 84 depending from deck portion 70, and serving as a structural member and as an enclosure for the conveyor parts.

As so far described, a bale emerging from chamber 20 will slide along deck 52 and upwardly along deck portion 70 into engagement with one of the flights 76 on conveyor 72, propelling the latter until it has progressed to the point of engagement of several, for example 3, of the flights 76. At this point, conveyor 72 becomes activated as will appear, and accelerates the bale in the general direction of conveyor 72 to a velocity at which it will be projected beyond the conveyor and deck portion 70 a desired distance.

Considerable force is necessary to accelerate a bale to such a velocity, and to prevent the bale from rising out of contact with flights 76, or possibly being torn by a slipping action, a hold-down shoe 86 is disposed generally parallel to, but spaced upwardly from conveyor 72 and deck portion 70 to be in sliding engagement with the upper surface of the bale during its engagement with conveyor 72. Shoe 86 has a considerably wider portion which is journaled on a cross member 88, FIG. 1, fixed in any suitable manner and carried on frame member 46. Since shoe 86 and its associated parts and operation are adequately described in U.S. Patent No. 3,198,106, further description here is believed not necessary.

As stated, conveyor 72 is activated from the compressing mechanism but only during the momentary periods when a bale is to be thrown. For this purpose, it is connected, as will appear, with plunger 68 so as to partake of a portion of the sine-wave movement of the plunger.

Turning to FIGS. 2 and 3, plunger 68 has a forward extension 90, preferably in the form of a downwardly open channel member at one side of bale case 20 so as to avoid interference with pitman 66 and which carries a pin or latch portion 92 disposed transversely to the plunger movement. Pin 92 therefore describes a reciprocating motion corresponding to that of plunger 68. A hook or latch portion 94 may engage pin 92 and partake of this motion, as will appear.

Hook 94 is pivoted as by a pin 96 to a pull rod 98 slidable in a bearing or guide 100 fixed in any suitable manner with wall 24.

Rod 98 is also guided in a bearing 102 and is preferably square or angular in cross section so that hook 94 will be maintained in relation to be engaged when desired by pin 92. Rearwardly from guide bearing 102, rod 98 is connected by means of a plate 104 with a pull rod 106 located centrally of bale chamber 20 beneath rail 26. Rod 106 connects through a clevis with a pull rod 108 which extends farther rearwardly to the region of above-mentioned pivot pin 42. Rod 108 connects with a chain 110 which propels conveyor 72 whenever it is pulled by rods 108, 106 and 98 by reason of engagement of hook 94 with pin 92.

Chain 110 extends rearwardly past pin 42 and over an idler sprocket 112 journaled on a pin 113 carried in the framing of unit 48 and about what may be termed a windlass mechanism. This windlass mechanism is fully disclosed in the above-mentioned patent and since it is not a part of the present invention, it is believed that further description is not necessary. Suffice it to say that chain 110 wraps about the windlass through the major part of its circumference, and is fixed at its end to a windlass sprocket 114 on a shaft 115. A pull on chain 110 will therefore rotate sprocket 114 throughout part of a revolution, the sprocket then being reversed so that the chain is wound back onto the sprocket. Adjacent sprocket 114 is a drive sprocket 116 on the same shaft driving through a chain 118 a sprocket 120 journaled on a shaft 121 suitably supported in framing 46. Sprocket 120 is fixed in relation to a sprocket 122 of a greater diameter than sprocket 120, the latter driving, through a chain 124, a sprocket 126 on a shaft 127 located at the upper end of conveyor 72.

It will now be apparent that a part revolution of sprocket 114 caused by a pull on chain 110 will cause similar rotation of sprockets 120 and 122, and increased rotation of sprocket 126. Rotation of sprocket 126 causes rotation of sprocket 80 and actuation of conveyor 72, and the ratios are such that a full unwrap of chain 110 from windlass sprocket 114 will cause sufficient movement of conveyor 72 to impart the maximum desired impetus to a bale engaged with flights 76.

The return mechanism for the windless sprocket 114 includes a helical type spring and an overrunning clutch on the same shaft as sprocket 114 and seen in FIG. 4. This part of the baler is also adequately disclosed in the above-mentioned patent and it is believed not necessary to further describe it as related to this invention. The return action comes into play between bale throwing movements as the bale is relatively slowly pressed outwardly onto conveyor 72, the parts being free to move under the pressure of the bale. The bale engages with flights 76 after which conveyor 72 comes into action and forcefully and rapidly propels the bale.

The trip mechanism will now be described as an improved device to insure quick and full engagement of the bale thrower drive with the plunger.

Hook 94 is engaged with pin 92 by the action of a bale as it moves into position to be thrown by the mechanism. For this purpose, a sensing device or trigger 128 mounted on hold-down shoe 86 is journaled in upstanding brackets 130, as shown in FIGS. 1 and 4. Trigger 128 has fingers 132 extending generally downwardly on either side of shoe 86 into the path of a bale sliding along the underside of the latter. Trigger 128 also has a downwardly directed U-shaped portion between brackets 130 to which is attached a tension spring 134. A bale passing rearwardly and upwardly in FIG. 1 will therefore eventually engage fingers 132 and cause rocking of the trigger 128 in a clockwise direction. Such movement will exert a pull on spring 134 and on a chain 136 attached to spring 134. Chain 136 is guided beneath above-mentioned cross member 88 and extends through an opening 138 in an upward extension of above-mentioned pin 40. In this way, chain 136 is guided for straight backward movement regardless of the side swinging of unit 48.

Chain 136 connects with a pull rod 140 which extends forwardly above bale case 20, and is pivotally connected to an upstanding lever means or arm 142 (see also FIGS. 2 and 3). Lever arm 142 is fixed in relation to a rockshaft 144 journaled transversely on bale case 20 and having a generally forwardly extending lever means or arm 146, at the left side of bale case 20, and lever arm 146, as best seen in FIG. 5, is pivoted to a generally vertical trip means or arm 148 which extends downwardly. A lever means or arm 150 is fixed to and extends forwardly from a rocker means or rockshaft 152 journaled beneath bale case 20 and extending across to the region of hook 94. A lever arm 154 extends generally in the direction of the length of bale case 20, and has a portion 156 which extends beneath hook 94 at a point spaced forwardly from rockshaft 152. A resilient means or spring 158, FIG. 5, is connected to the upper end of trip arm 148 and connected to pull downwardly on lever arm 146, and tends to oppose above-mentioned spring 134. Trip arm 148, at its upper end, has a clevis 160 through which a pin 162 pivotally supports the trip arm on lever arm 146. Spring 158 is connected to clevis 160 and is pivotally connected, as by a pivot pin 163, to lever arm 150, which is an extension of rockshaft 152, and connected to pull upwardly on arm 150. An upwardly extending cam means or bracket 164 is fixed to lever arm 150, as by welding, which bracket is positioned to be engageable with the lower end 165 of trip arm 148. This bracket is located generally between the trip arm 148 and spring 158 in one position of the trip arm, as shown in FIG. 5, this being the locked-out position when the bale thrower mechanism and its associated drive is at rest. Under these conditions, pin 92 does not engage hook 94 and the throwing mechanism remains at rest.

It is thus seen that spring 158 tends to resist the action of spring 134 and also urges arms 146 and 150 toward each other. The tension in spring 158 is sufficient to keep the lower end 165 of trip arm 148 rearward of bracket 164 until an emerging bale overcomes this tension through the above described linkages. When the trigger 128 is swung rearwardly in incremental steps by an emerging bale, spring 134 pulls on chain 136 and rod 140, raising lever arm 146 and tending to move lever arm 150 together with lever arm 154, and tending to swing hook 94 into the dotted position of FIG. 2, where it will be encountered by pin 92 on the next rearward reciprocation thereof. Pin 92 will encounter a cam or ramp surface 166 thereby momentarily swinging hook 94 downwardly so that pin 92 may proceed past a lip portion 168 and enter a notch or socket 170 formed on hook 94.

Hook 94 may be forced downwardly in this manner by yielding of springs 134 and 158, the resiliency of the springs, however, returning the parts to the dotted position in FIG. 2, virtually instantly as soon as pin 92 has passed lip 168, so that pin 92 is engaged in socket 170. At this point, plunger 68 and pin 92 start their return movement and the pin is solidly lodged in notch 170 by reason of the pull or load on hook 94.

Adjacent to and upwardly from cam bracket 164 is a guide means or bracket 174 secured to the baler side wall 22 by bolts 176, bracket 174 defining an opening or slot 178. Trip arm 148 is normally free to move or slide in slot 178 but the slot contains fore-and-aft or side-to-side movement of the trip arm.

The forces pulling on spring 134, chain 136, and pull rod 140, due to the emerging bale, start rotation of lever arm 146 and also increase the tension in spring 158 so that as soon as these forces become sufficient to move arm 148 upwardly with the rotation of arm 146 against the tension in spring 158, trip arm 148 rapidly clears cam bracket 164 and pin 92 quickly becomes lodged in notch 170. To insure against dislodgment, notch 170 is "undercut" slightly beneath lip 168. As seen in FIG. 5, a rearward pull on rod 140 will rotate arms 146 and 150, but this rotation is opposed by spring 158 which tends to hold trip arm 148 in slot 178 and rearward of bracket 164. As the force of an emerging bale overcomes the pre-set tension in spring 158, arm 146 slowly rotates, increasing the tension in spring 158, arm 148 is moved upwardly in opening 178 but bracket 164, being secured to arm 150, cannot rotate until the lower end 165 slips over the edge of the cam surface 180. When this action occurs arm 150 and bracket 164 rotate and the bale launcher mechanism is tripped for actuation by the plunger. The trip action is extremely fast due to the increased tension in spring 158 and as a result of this tension, the latch means or hook 94 is quickly and fully engaged with the plunger.

As stated, the movement of hook 94 and rod 98 and its attached parts starts the throwing movement of the bale, but it will be observed that pin 92 becomes lodged in hook 94 substantially at the rearmost limit of the travel of plunger 68 so that the pin is momentarily stationary, and then starts its forward movement with a gradual acceleration, characteristic of the sine-wave movement. There is, therefore, no serious impact or shock load imposed on any of the parts.

After the desired amount of movement has been imparted to rod 98 and thence to conveyor 72, ramp portion 166 of hook 94 encounters a stationary trip pin 172, which rocks hook 94 downwardly about pin 96 and disengages it from pin 92. In the meantime, the bale has traversed conveyor 72 and been thrown entirely clear of unit 48 so that the trip mechanism has been returned to its inactive position. The mechanism then remains inactive until it is time to throw another bale.

FIG. 6 shows a modification or an alternate construction of the trip device wherein pull rod 140, lever arm 146 and shaft 152 are substantially the same as described above, however, the parts and operation are varied slightly. A generally vertical trip means or rod 182 is disposed alongside bale case 20 and between arm 146 and shaft 152. Rod 182 has side guides 184 and 186 fixed on the lower end of the rod for purposes to be described. The upper end of rod 182 is connected to arm 146 by means of an adjusting rod 188 threadedly engaged in a clevis 190, the clevis being connected to arm 146 on a pivot pin 191 and the adjusting rod being connected to rod 182 on a pivot pin 192. In this manner rod 182 and arm 146 can be adjusted in relation to each other which also provides an adjustment for the timing in the trip cycle.

A guide means or bracket 194 is secured to the baler side wall 22 by suitable bolts, the bracket having elongated slots for location adjusting purposes. The bracket has an extending portion 196 to which is pivotally connected a clevis 198 on a pin 200. An adjusting rod 202 is threadedly engaged in clevis 198 and the rod is pivotally connected to rod 182 on a pin 204. A spring arm 206 is fixed to bracket 194 and extends in a curved direction toward the front of the baler. Arm 206 has an opening 207 near the end thereof for insertion of the upper end of rod 182, the purpose of which will be described.

Fixed on shaft 152 at one end thereof is a lever arm 208 extending forwardly of the shaft. Arm 208 has a cam means or portion 212 fixed thereto in the nature of a cam bracket extending upwardly of arm 208. A spring 210, similar to spring 158 as described in the above embodiment, is connected at one end to spring arm 206 and at the other end to lever arm 208. A roller 214 is journaled on a pin 216, the roller being supported between side guides 184 and 186 and the pin 216 being supported from the side guides. These guides are on either side of the cam bracket 212 and provide side-to-side guiding of the trip rod and the roller. The roller is especially well adapted in this construction to reduce friction and wear which is an advantage over the structure shown in FIG. 5.

The opening in spring arm 206 is designed to fit over the upper end of rod 182 on a shoulder such that spring 210 holds the spring against the shoulder and tends to pull arm 146 and arm 208 toward each other. It is thus seen that spring 210 holds arm 206 against the shoulder of rod 182, the upper end of rod 182 is free to move with arm 146 and the lower end of rod 182 with roller 214 moves along a cam surface 218 and onto a cam surface 220 in the tripping operation. The guides 184 and 186 keep the roller engaged with the surface of the cam bracket in a defined side-to-side path and the adjusting rod 202 maintains the trip rod in a defined fore-and-aft path. This pivoted rod adjusts the relationship of the trip rod with its roller on the cam surface and also adjusts the position of the rod 98 and hook 94 in the "at rest" position.

The operation of the device is thought to be clear from the foregoing, but to summarize, the hay or fibrous material is compressed within bale case 20 by the action of plunger 68 in well-known manner, the finished bales after tying being relatively slowly pressed out through the rear end of bale case 20. They then pass on to deck 52, guided by wings 54 and 56, and on into engagement with the flights 76 of conveyor 72. Conveyor 72 is readily propelled by the bales by virtue of the overrunning clutch so that the particular bale to be thrown may become engaged with several of the flights 76. After this has occurred, triggers 132 are pressed rearwardly by the emerging bale and, through spring 134 and its attached linkage, raise hook 94 into position to become quickly and fully engaged with pin 92 which is continuously carried back and forth by the reciprocation of plunger 68.

Once engaged, hook 94 is pulled by the next retracting or forward reciprocation of plunger 68 and, through pull rod 98 and pull rods 106 and 108 exerts a pull on chain 110.

As the bale emerges across deck 52 and engages with fingers 132, these fingers move rearwardly pulling on spring 134 and tending to pull chain 136 and the associated lever arm linkage. However, spring 158 is in tension and holds the trip arm 148 over the edge of cam bracket 164 and therefore rockshaft 152 cannot rotate. As the bale emerges farther to the rear, the tension in spring 134 overcomes the tension in spring 158 and the rockshaft 144 rotates until, at the proper predetermined time in the plunger cycle, the trip arm end 165 slips over the cam bracket edge onto cam surface 180, shaft 152 rotates, and hook 94 engages quickly and fully with pin 92 to drive the bale thrower mechanism.

At a predetermined point in the forward reciprocation of plunger 68, hook 94 is disconnected by the action of trip pin 172 so that pull rod 98 may be returned in a rearward direction. Trip pin 172 bears on portion 166 of hook 94 to disengage hook 94 from pin 92. At this instant, pull rod 98 and hook 94 are returned rearward by the helical type spring acting on windlass sprocket 114 and the impact of hook 94 against arm 154 of shaft 152 overcomes the force of spring 158 on the trip device and resets the mechanism. Another way of describing the resetting of the trip device is that on the rearward stroke of the plunger, pin 92 contacts hook 94 and forces hook 94 downward against arm 154 of shaft 152. This, in turn, forces arm 150 down and moves the end 165 of trip arm 148 over cam surface 180 and drops behind the cam bracket to the position shown in FIG. 5, thus resetting the mechanism.

In FIG. 6 this action is similar in that arm 208 is forced down and this moves roller 214 along cam surface 220 and along cam surface 218 to the position shown.

The point at which hook 94 is released by the action of trip pin 172 may determine the velocity which the mechanism and the bale will reach. For this reason, trip pin 172 is adjustable in position to act on hook 94 at any desired point in the retracting movement of plunger 68. Normally, tripping of hook 94 would take place, at the latest, at a point of maximum retracting velocity of plunger 68, and the proportions would be such that under these conditions, a bale would be thrown to or slightly beyond the farthest desirable point. Adjusting pin 172 rearwardly or toward the position of hook 94, shown in FIG. 2, would cause earlier release of the hook and less velocity in the bale being thrown.

Variations on the foregoing description will, no doubt, occur to those skilled in the art; for example, other means might be used for conveying the motion of plunger 68 to conveyor 72, and other means may be used to provide a trip which quickly and fully engages the bale thrower mechanism with the reciprocating plunger, and it is to be understood that all such means are contemplated as within the scope of the invention, insofar as defined in the claims.

What is claimed as new and desired to be secured by Letters Patent of the United States is:

1. A trip device for a hay baler of the type having a reciprocating plunger and a bale throwing mechanism, said device being positioned to be actuated by said bale throwing mechanism and including
   lever means on said baler connected to said bale throwing mechanism,
   trip means pivotally connected to said lever means and extending along the side of said baler,
   guide means on said baler, said guide means positioned for guiding said trip means in a defined path,
   latch means on said baler in position to be connected to said reciprocating plunger for intermittently driving said bale thrower,
   rocker means connected to said latch means, said rocker means positioned below said lever means,
   resilient means connected to said trip means and to said rocker means for urging said trip means and said rocker means toward each other, and
   cam means connected to said rocker means and engageable with said trip means whereby emergence of a bale from the baler rotates said lever means and said rocker means and moves said trip means along said cam means, and at a predetermined position connects said reciprocating plunger with said bale launching mechanism.

2. A device according to claim 1 wherein the lever means is an arm connected to said bale throwing mechanism.

3. A device according to claim 1 wherein the trip means is an arm extending generally in a downward direction alongside said baler.

4. A device according to claim 1 wherein the guide means is a bracket positioned for guiding said trip means in a defined path.

5. A device according to claim 4 wherein the guide means includes a pivotal adjusting rod connected to said trip means and to said bracket.

6. A device according to claim 1 wherein the resilient means is a spring positioned adjacent the trip means, said spring tending to hold said trip means in one position in said guide means and to oppose actuation of said trip means.

7. A device according to claim 1 wherein the resilient means is a spring tending to oppose rotation of said rocker means and thus prevent operation of said bale thrower mechanism until said latch means quickly and fully engages with said reciprocating plunger.

8. A device according to claim 1 wherein the cam means is a bracket connected to said rocker means and engageable with said trip means.

9. A device according to claim 3 wherein the guide means is a bracket and defines a slot for guiding said trip means in a defined path.

10. A device according to claim 1 wherein the guide means is positioned upwardly of said cam means for guiding said trip means.

11. A device according to claim 1 wherein the trip means on said baler includes roller means positioned downwardly of said lever means.

12. A device according to claim 11 wherein the cam means is a bracket positioned to be engageable with said roller means.

References Cited

UNITED STATES PATENTS

| 3,115,976 | 12/1963 | De Buhr et al. | 214—83.3 |
| 3,198,106 | 8/1965 | Skromme | 100—188 |
| 3,198,107 | 8/1965 | Gawreluk | 100—188 |

LOUIS O. MAASSEL, *Primary Examiner.*